United States Patent
Stockwell et al.

(10) Patent No.: US 6,266,247 B1
(45) Date of Patent: Jul. 24, 2001

(54) POWER SUPPLY CONNECTION SYSTEM

(75) Inventors: Michael L. Stockwell, Lake Forest; David H. Dorr, Mission Viejo; Khanh C. Bui, Irvine, all of CA (US)

(73) Assignee: Racal Instruments Inc., Irvine, CA (US)

( * ) Notice: Subject to any disclaimer, the term of this patent is extended or adjusted under 35 U.S.C. 154(b) by 0 days.

(21) Appl. No.: 09/378,782

(22) Filed: Aug. 23, 1999

Related U.S. Application Data
(60) Provisional application No. 60/097,739, filed on Aug. 24, 1998.

(51) Int. Cl.$^7$ ................................. G06F 1/16; H05K 7/00
(52) U.S. Cl. .......................... 361/724; 307/43; 307/141; 361/679; 361/726
(58) Field of Search ..................... 361/679–686, 361/724, 725, 727, 728, 730, 733

(56) References Cited

U.S. PATENT DOCUMENTS

| | | | |
|---|---|---|---|
| 3,812,381 | * | 5/1974 | Guyton ............................ 317/101 D |
| 4,818,237 | * | 4/1989 | Weber ................................... 439/693 |
| 4,862,326 | * | 8/1989 | Blomstedt et al. .................. 361/413 |
| 4,899,254 | * | 2/1990 | Ferchau et al. ...................... 361/724 |
| 5,023,754 | | 6/1991 | Aug et al. . |
| 5,031,070 | | 7/1991 | Hsu . |
| 5,347,430 | | 9/1994 | Curlee et al. . |
| 5,349,132 | | 9/1994 | Miller et al. . |
| 5,407,362 | | 4/1995 | Carstens et al. . |
| 5,436,800 | | 7/1995 | Maruska et al. . |
| 5,546,282 | | 8/1996 | Hill et al. . |
| 5,570,270 | | 10/1996 | Naedel et al. . |
| 5,600,538 | | 2/1997 | Xanthopoulos . |
| 5,612,854 | | 3/1997 | Wiscombe et al. . |
| 5,625,535 | * | 4/1997 | Hulsebosch et al. ................ 361/719 |
| 5,680,294 | | 10/1997 | Stora et al. . |
| 5,689,406 | * | 11/1997 | Wood et al. .......................... 361/796 |
| 5,761,045 | | 6/1998 | Olson et al. . |
| 5,768,097 | | 6/1998 | Jelinger . |
| 5,822,184 | | 10/1998 | Rabinovitz . |
| 5,945,746 | * | 8/1999 | Tracewell et al. ...................... 307/43 |

OTHER PUBLICATIONS
drawing of Racal Instruments, Inc.'s products—4 pages.

\* cited by examiner

*Primary Examiner*—Leo P. Picard
*Assistant Examiner*—Lisa Lea-Edmonds
(74) *Attorney, Agent, or Firm*—William A. Newton (57) ABSTRACT

Disclosed is a chassis comprising an enclosure, a power supply assembly mounted in the enclosure and a backplane assembly mounted in the enclosure in abutting relationship with the power supply assembly; the backplane assembly having a plurality component connectors mounted thereon and a plurality of stand-off posts protruding therefrom, each of the stand-off posts including a first aperture and being electrically coupled to one of the component connectors; the power supply including a panel with a plurality of electrical contacts disposed thereon, each of the electrical contacts having a second aperture; and a plurality of screws disposed through the first and second apertures for securing the electrical contacts of the power supply to the stand-off posts of the backplane assembly.

5 Claims, 9 Drawing Sheets

POWER SUPPLY CONNECTION SYSTEM

CROSS REFERENCE TO RELATED APPLICATIONS

This application claims the benefit of U.S. Provisional Application No. 60/097,739, filed Aug. 24, 1998, which is hereby incorporated by reference.

BACKGROUND

1. Field of the Invention

This invention relates to mounting electronic components in a chassis and particularly relates to the mounting of a power supply assembly in an electronic component chassis.

2. Description of the Background Art

In present day electronic devices that incorporate the use of an internal power supply, the power supply itself is mechanically mounted in the chassis or housing of the device. The electronic connection of the power supply to the electronic components in the device is then typically made through the use of either of an electrical connector or wire connections. Both approaches, however, require the use of "hard wiring" insofar as electrical connectors require the use of wire leads connected to the connector itself and wire connections require the use of wire conductors connecting the power supply to a specific electronic component.

SUMMARY OF THE INVENTION

One objective of the present invention is to eliminate the previously described "hard wiring" approaches and instead to allow for direct connection between the power supply and the associated components. As a result of this direct connection, there is less cost involved in the manufacture of the assemblies for the component chassis and construction of the chassis is simplified.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE PREFERRED EMBODIMENT

Figure 1:
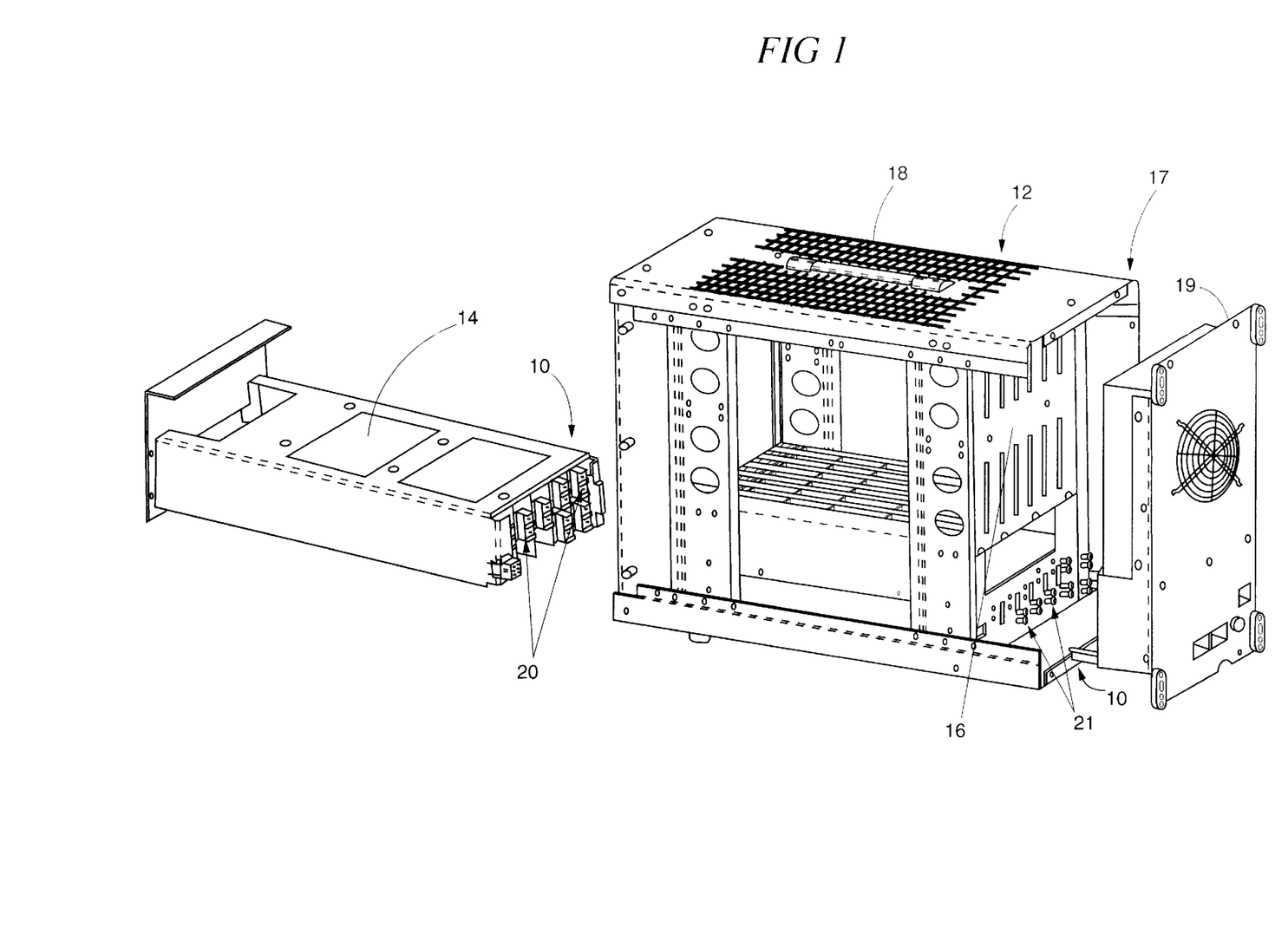
FIG. 1 shows in exploded perspective a chassis incorporating the power supply connecting arrangement of the present invention.

FIG. 1 shows a preferred embodiment of a power supply connecting arrangement 10 of the present invention implemented in a chassis 12 for electronic components (not shown). It can be seen that the chassis 12 includes a conventional power supply assembly 14, a backplane assembly 16 and an enclosure 17. The enclosure 17 has a mainframe 18 and a conventional back compartment 19 containing a fan. The power supply connecting arrangement 10 of the present invention includes power supply mating hardware contained on the rear of the power supply assembly 14 and on the backplane assembly 16. More specifically, the plurality of output contacts 20 of the power supply assembly 14 are disposed in mating relationship with a plurality of stand-off posts (shown in subsequent figures) of the backplane assembly 16 so as to provide a direct electrical connection between the power supply assembly 14 and the backplane assembly 16 without the need for "hard wiring" described in the Background section. This mating relationship is maintained by a plurality of screws 21 as will be described hereinafter.

Figure 2:
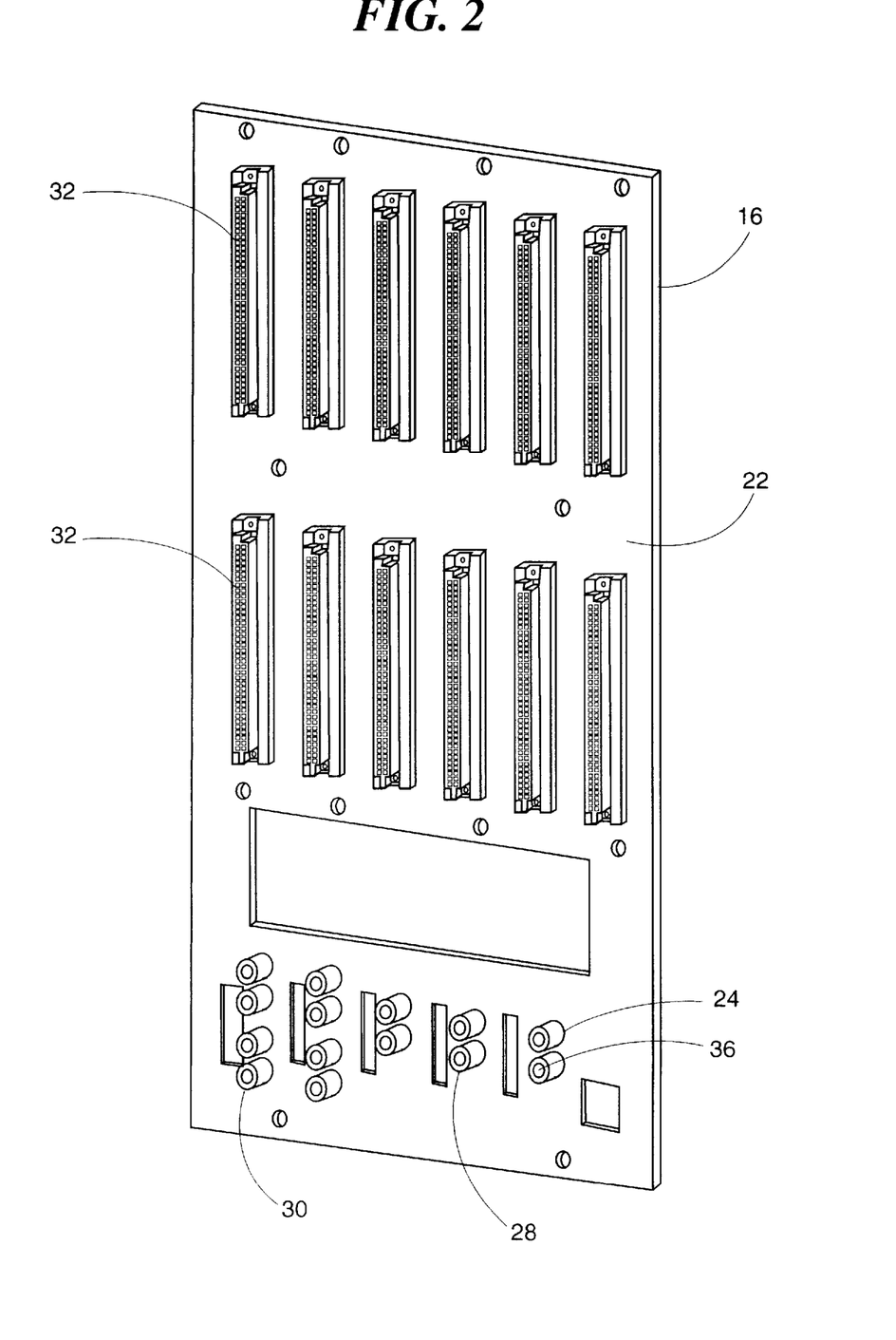
FIG. 2 shows in perspective the side of a backplane assembly which has protruding therefrom a plurality of stand-off posts.

As shown in FIG. 2, the backplane assembly 16 includes a backplane panel 22 and a plurality of stand-off posts 24 mounted on one side of the backplane panel 22. Each of the stand-off posts 24 comprise a hollow piece containing a first aperture 26 which is centrally positioned along the radial axis of the stand-off post 24 and extends through the backplane panel 22. As an illustrative example, the preferred embodiment is shown with the stand-off posts 24 comprising four larger diameter cylindrical stand-off posts 28 and six smaller diameter cylindrical stand-off posts 30.

It should be understood that the backplane panel 22, in a conventional manner, comprises a printed circuit board ("PCB") having the appropriate traces (not shown) linking various areas of one portion of the panel 22 to other designated areas of the panel 22. In particular, the panel 22 has traces extending from the locations of the stand-off posts 24 to the appropriate locations where a plurality of component connectors 32 are fixed on the panel 22. In this manner the panel 22 enables the delivery of power supply to the appropriate components that are attached to the connectors 32.

Figure 3:
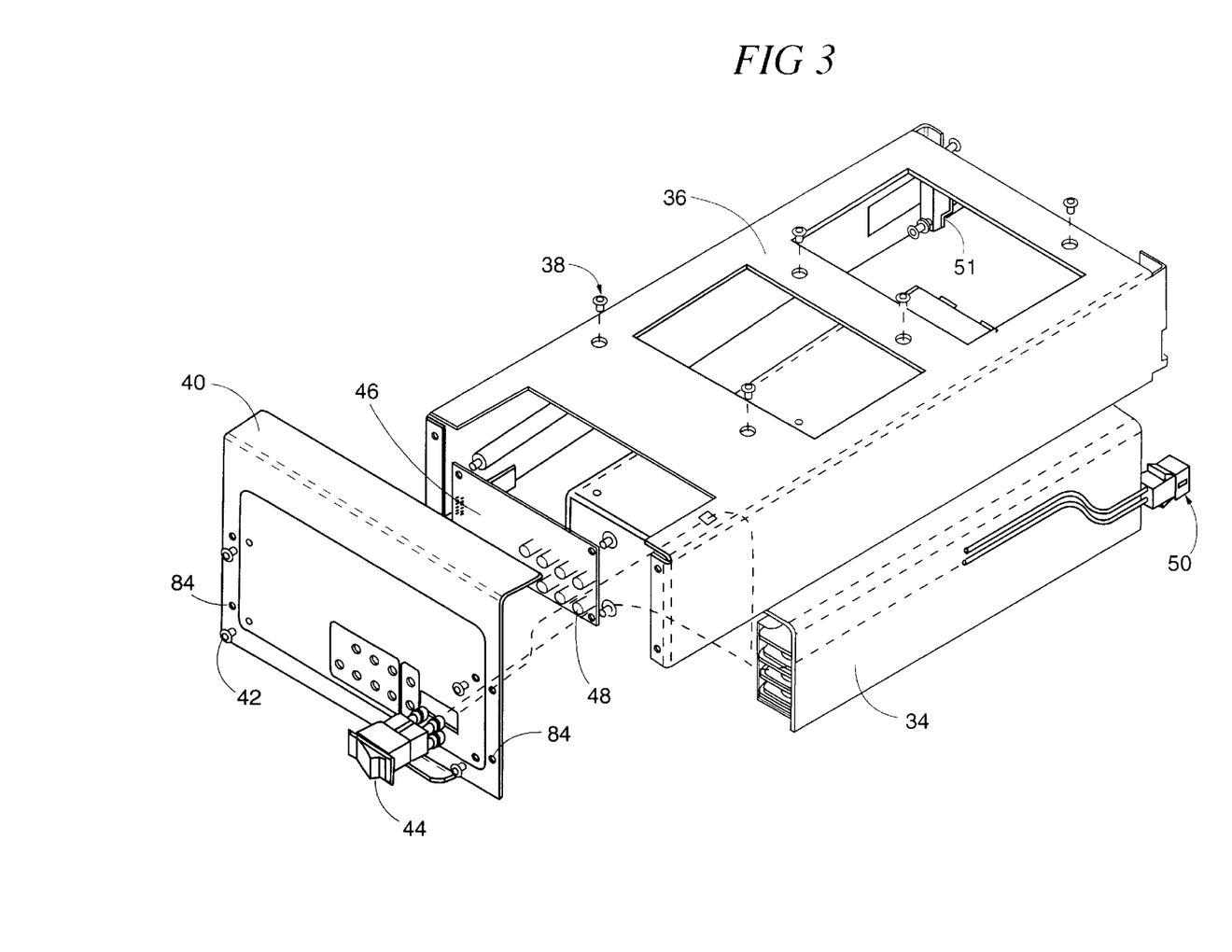
FIG. 3 shows in exploded perspective a power supply assembly.

As shown in FIG. 3, an exploded view of the power supply assembly 14 (previously shown in FIG. 1) includes a conventional off-the-shelf power supply 34, an upside down U-channel enclosure 36 with the power supply 34 mounted therein by screws 38 and a front panel 40 mounted to the enclosure 36 by screws 42. The remainder of power supply assembly 14, such as switch 44, intermediate panel 46 with a plurality of indicators 48 mounted thereon, first and second plugs 50 and 51, respectively, and the wiring for these components, also are well known components of conventional power supply assembly designs, are not part of the present invention and will not be described further. The power supply shown in FIG. 3 is an off-the-shelf unit manufactured by Deltron, Inc. and has a model number of M72B2206633-RAL.

Figure 4:
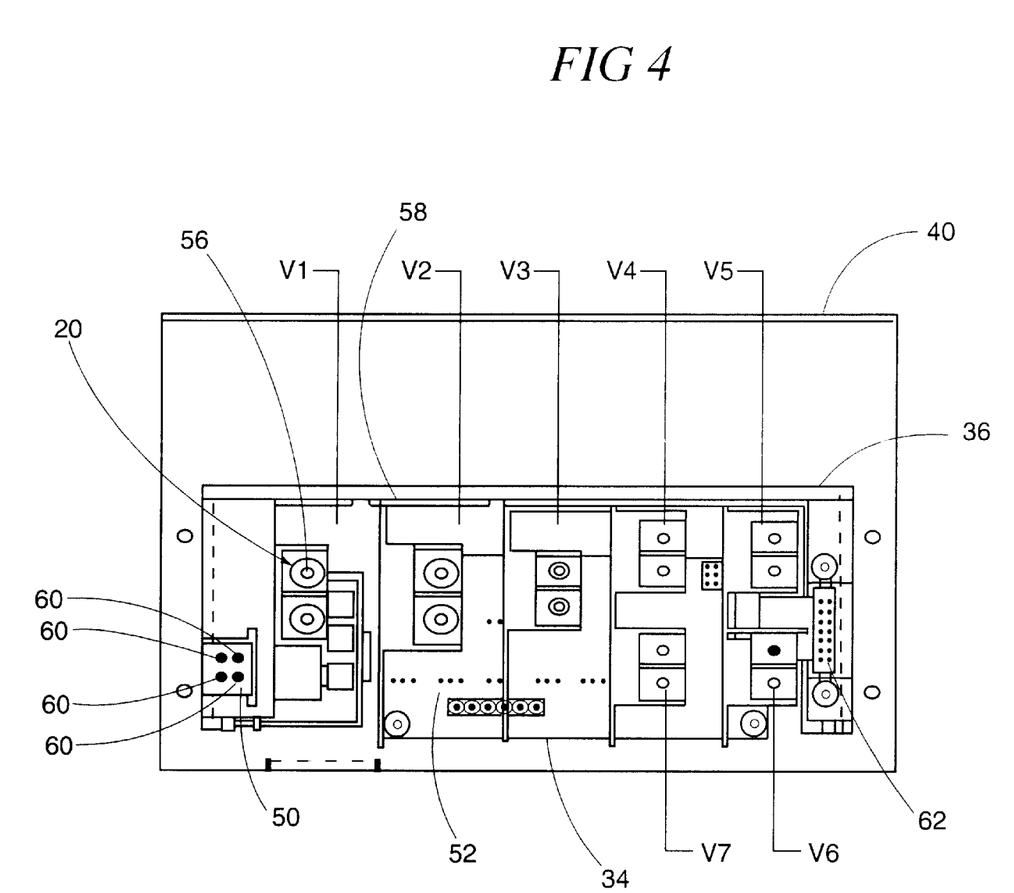
FIG. 4 shows a back view of the power supply assembly.

In FIG. 4 a back view of the power supply assembly 14 is shown. The previously described power supply 34, enclosure 36 and front panel 40 are shown in this back view. The conventional power supply 34 includes a rear portion 52 having the array of DC output contacts/terminals 20 for providing DC voltages V1 through V7. As will be shown in subsequent FIGURES, there is one power supply contact 20 disposed and configured to abut with each of the stand-off posts shown in FIG. 2. Each of the contacts 20 includes a centrally disposed, threaded second aperture 56. As is standard design for power supplies, a plurality of DC output printed circuit boards (PCB's), for which only the terminal blocks are shown, are mount to L shaped brackets 58 via standoffs (not shown). The first plug 50 is shown having four pins 60. Those skilled in the art will appreciate that there are ways other than the described power supply assembly in which the power supply may have its contacts disposed in electrical contact with the stand-off posts of the backplane assembly.

Figure 5:
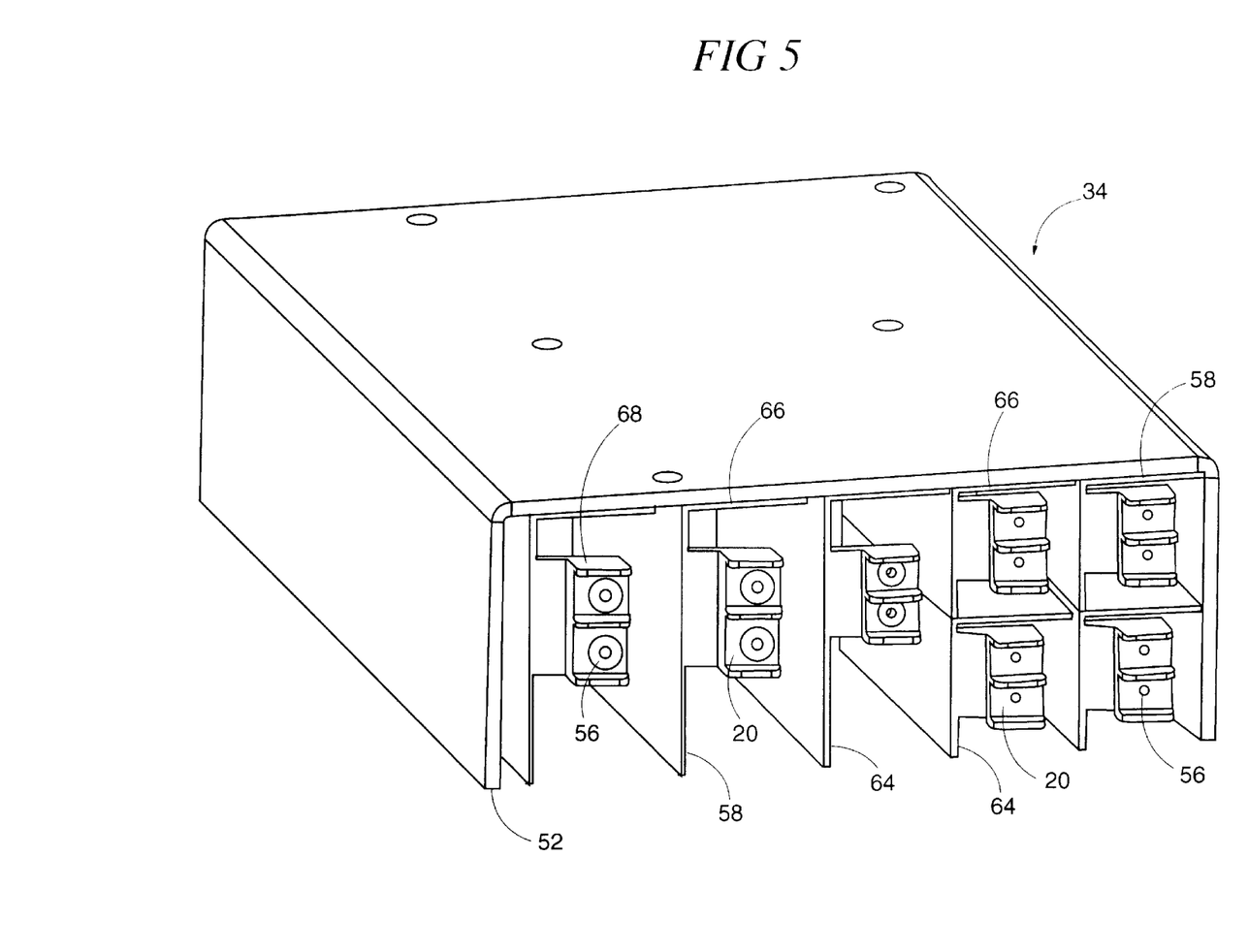
FIG. 5 shows in perspective a power supply of the power supply assembly.

In FIG. 5 the rear portion 52 of the conventional power supply 34 having the contacts 20 is shown in a perspective view, so as to provide additional detail. The DC output contacts 20 are mounted on the end of the DC PCB's, which in turn are mounted to the vertical legs 64 of the L shaped brackets 58. The contacts 20 are PCB mounted right angle terminal blocks 68. The other leg 66 of the L shaped bracket 58 is mounted to the top of the power supply 34. In a well known manner, the DC output PCB contains the circuitry necessary to generate the desired DC voltage from a somewhat higher input voltage coming from the main transformer (not shown). Any of many commercially available units having output contacts on the rear portion could be used with the present invention and the power supply 34 shown in the FIGURES is merely illustrative of one such available unit.

Figure 6:
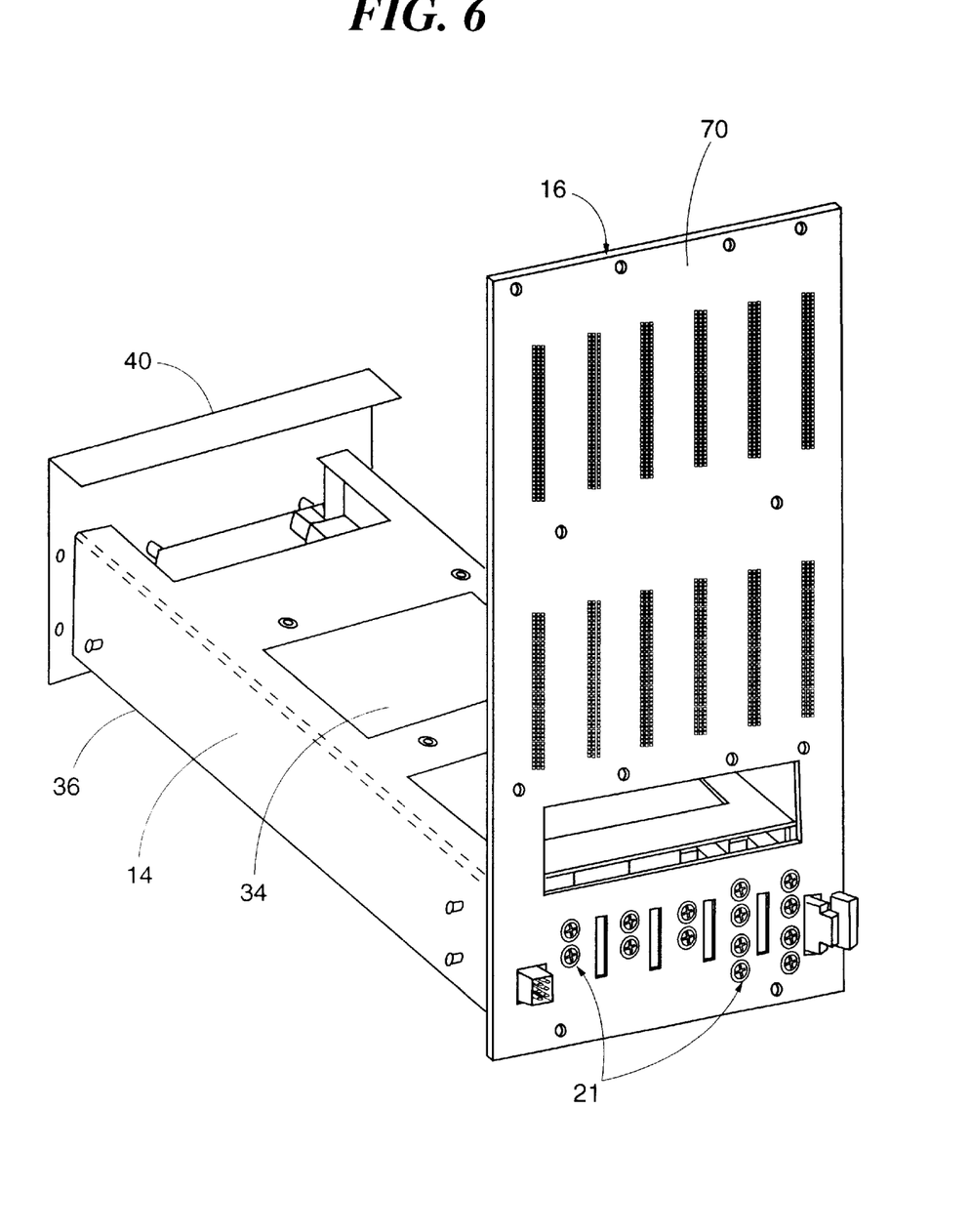
FIG. 6 shows in perspective the power supply assembly and backplane assembly in abutting relationship.
Figure 7:
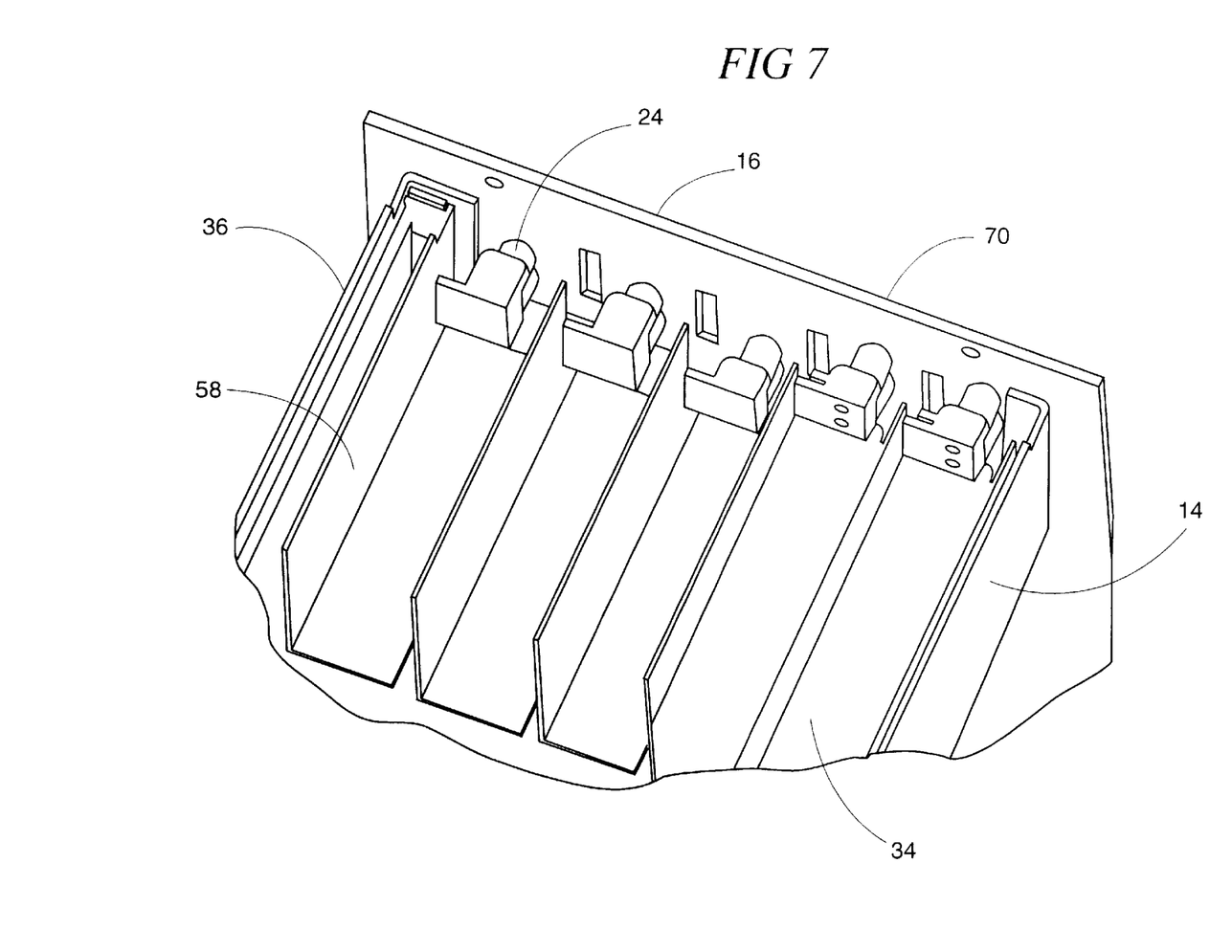
FIG. 7 shows in perspective the underside of the power supply assembly and the backplane assembly.

Referring to FIGS. 6 and 7, the backplane assembly 16 and power supply assembly 14 are mated together, as they would exist when the two components have been included in chassis. To better illustrate the mating relationship between these two assemblies, the rest of the chassis is not shown in FIGS. 6 and 7. The power supply assembly 14 is shown with enclosure 36, power supply 34 and front panel 40, as previously described. As best shown in FIG. 7, each standoff post 24 of the backplane assembly 16 abuts with one of the contacts 20 of the power supply assembly 14. More specifically, the stand-off posts 24 are arranged and dimensioned to mate with electrical contacts 20 on a rear portion of the power supply assembly 14. The stand-off posts 24 have predetermined heights or outward extensions from the backplane panel 22 that space the backplane panel 22 from the rear end of the power supply assembly 14. To secure the backplane panel 22 to the contacts 20, the screws 21 are inserted through the back side 70 of the backplane panel 22 and through the stand-off posts 24 until they engage with the mating threads of the contacts 20 of the power supply assembly 14. Hence, the first aperture 26 of one of the stand-off posts 24 is aligned with the second aperture 56 of one of the contacts 20. In this manner, an electrical connection is established between the array of contacts 20 on the power supply assembly 14 and the array of stand-off posts 24 on the backplane panel 22.

In the preferred embodiment, the stand-off posts 24 are securely mounted on the backplane panel 22. However, those skilled in the art will recognize that there are many interchangeable variations of this arrangement. For example, the stand-off posts could be securely mounted on the rear portion of the power supply 14 instead of the backplane panel 22. In our case preferred embodiment, the off-the-shelf power supply 34 has a convenient surface parallel to the backplane panel 22 (contact area on a terminal block). Since the terminal block contact has a threaded-hole to accept a #6 screw, it is possible to install a male-female or male-male standoff into the terminal block. In the preferred embodiment, the inventors chose not to do this, because the standoff could come loose. Instead the present invention uses a swedged spacer (stand-offs 24) on the backplane panel 22—which is a permanent connection that is not going to come loose. Although even less desirable, the standoff-posts or spacers could be un-mounted from both the power supply 34 and the backplane panel 22, i.e., not integrally attached to either and merely kept in place between the two components by the traversing screws 21. This approach, although possible, is less desirable because there would be lots of loose hardware that could complicate assembly.

In the preferred embodiment, a conductive standoff 24 is used to reduce the IR drop in the connection. The screw 21, if conductive, could be used to provide an electrical connection, but a conductive standoff 24 is superior.

Figure 8:
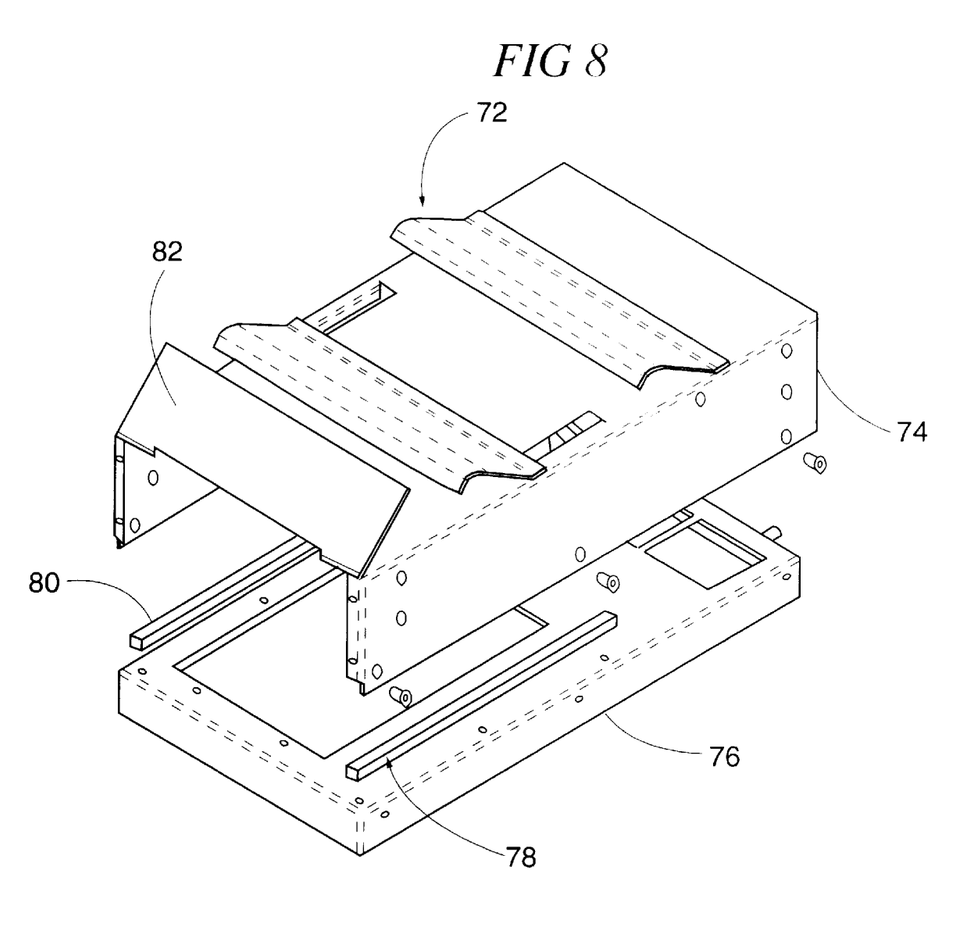
FIG. 8 shows an exploded view in perspective of an encasement for the power supply assembly.
Figure 9:
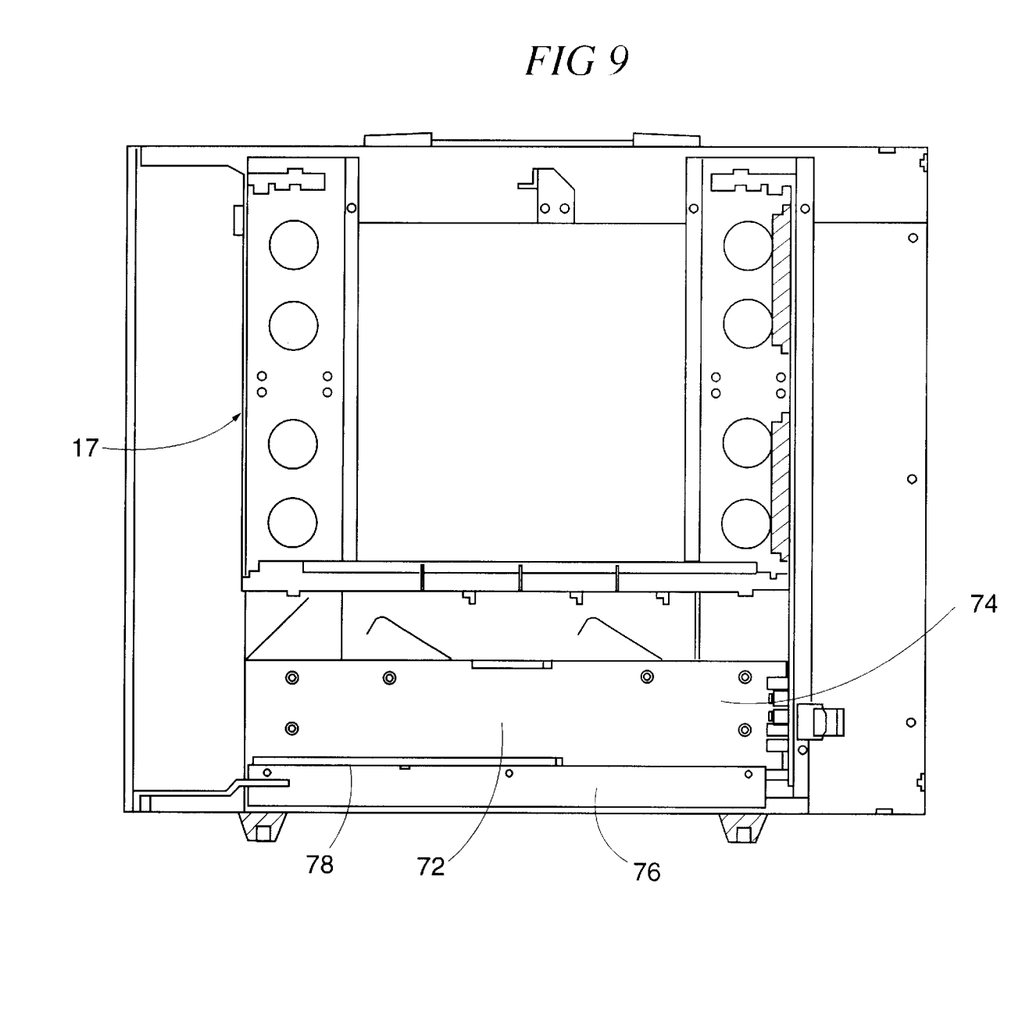
FIG. 9 shows a side view of the chassis with the encasement mounted therein.

Referring to FIG. 8, an encasement 72 is shown in an exploded view. The encasement 72 includes a top portion 74 and a bottom portion 76. The bottom portion 76 includes a pair of parallel guides 78 and 80. A flap 82 forms a front wall to the encasement 72. The encasement 72 is dimensioned and configured so that the power supply assembly 14 of FIG. 1 slides into the encasement 72 using the guides 78 and 80. Once the power supply assembly is fully inserted into the encasement 72, it is secured in place by the screws 21 shown in FIG. 1 and by four front panel screws (not shown) which are inserted into holes 84 of the front panel 40 in FIG. 3. The power supply is removable therefrom when the screws 21 of FIG. 1 and the front panel screws are unscrewed. The wireless electrical connection is made from the power supply assembly 14 to the backplane assembly 16 with the screws 21. With respect to FIG. 9, the encasement 72 is shown securely mounted in the enclosure 17. The encasement 72 is permanently installed into the enclosure 17 to form a cavity for receiving the power supply assembly 14. Those skilled in the art will appreciate that there are other ways in which the power supply may be mounted in the chassis so that its output contacts will be in contact with the standoff-posts of the backplane assembly.

The present invention may be implemented in a number of ways, as will be clear to those skilled in the art. Of course, those skilled in the art will appreciate that while this arrangement is preferred, it is not intended to be limiting as other arrangements of the frame are possible.

What is claimed is:

1. A chassis comprising:

an enclosure, a power supply, mounted in said enclosure, having a plurality of electrical contacts disposed thereon;

a backplane assembly, mounted in said enclosure, having a plurality of component connectors mounted thereon; and a plurality of stand-off posts interposed between said backplane assembly and said power supply, with said stand-off posts being electrically coupled to said component connectors and disposed in electrical contact with said electrical contacts of said power supply;

each of said stand-off posts being configured and disposed to extend outward from said backplane assembly to be in contact with one of said contacts of said power supply when said backplane assembly is in abutting relationship with a panel of said power supply;

each of said stand-off posts having a first aperture and each of said electrical contacts having a second aperture, said first apertures of said stand-off posts being disposed in aligned relationship with said second apertures of said power supply assembly when said backplane assembly is in said abutting relationship with said panel of said power supply; and a plurality of elongated securing means disposed through said first and second apertures for securing said electrical contacts of said power supply in non-retractable, locked engagement with said stand-off posts of said backplane assembly when said backplane assembly is in said abutting relationship with said panel of said power supply, whereby said stand-off posts allow for the electrical connection of said power supply to said backplane assembly without the need for wiring or electrical connectors having wire leads.

2. The chassis according to claim 1, wherein said backplane assembly has said plurality of stand-off posts securely mounted thereon.

3. The chassis according to claim 1, wherein said backplane assembly comprises a printed circuit board.

4. The chassis according to claim 1, wherein each of said second apertures includes threads, said securing means comprise a screw disposed in threaded engagement with said threads of said second aperture.

5. The chassis according to claim 4, wherein a center axis of said screw is coincident with the center axis of said first and second apertures.

* * * * *